United States Patent Office 3,703,535
Patented Nov. 21, 1972

3,703,535
DIAMIDO AMINO SULFONATES AND METHODS FOR PREPARING SAME
Hans S. Mannheimer, 23 Haines Cove Drive,
Toms River, N.J. 08753
No Drawing. Filed Apr. 30, 1971, Ser. No. 139,279
Int. Cl. C07c *143/90*
U.S. Cl. 260—401
9 Claims

ABSTRACT OF THE DISCLOSURE

Novel compounds of the formula:

wherein R and $R_1$ are hydrocarbon radicals; X is an alkali metal, or equivalent cation. They are produced by reacting hydroxy propane sultone with certain diamido derivatives of diethylene triamine.

---

The novel compounds of this invention are of the generic Formula I:

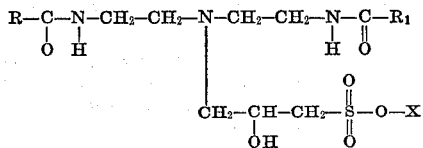

wherein R and $R_1$ are straight or branch chain aliphatic hydrocarbon radicals, either saturated or ethylenically unsaturated, that is the unsaturation is due to one or more ethylenic linkages therein; R and $R_1$ may be the same or different and R is of 1–21 carbon atoms and $R_1$ is of 5–21 carbon atoms; X is an alkali metal or hydrogen or other equivalent cation.

The compounds of this invention have unexpected combinations of different properties: they are all amphoteric, surface active agents having wetting properties, and ranging from low to high water solubility and from low to high foaming characteristics. These compounds find application in many fields: some are especially useful as high temperature detergents for industrial cleaning, others as low foamers in the fields of textile treating, industrial cleaning and hair conditioners, others as good foamers in the cosmetic field, such as components of shampoos, others as emulsifiers in systems of polar or non-polar organic liquids and water.

In one of the preferential aspects of the invention compounds of Formula I are good foamers and find especial application in the cosmetic field when R is $CH_3$ and $R_1$ is an alkyl radical of 9–13 carbon atoms.

In another preferential aspect of the invention compounds of Formula I are low foamers of good to excellent wetting properties when R and $R_1$ are the same or different and each is of 5–21 carbon atoms. These compounds find especial application as industrial cleaning and textile treating agents and also as emulsifying agents as shown in the examples herein. These compounds of Formula I with R and/or $R_1$ being ethylenically unsaturated and of 17 carbon atoms are low foamers and are especially useful as emulsifying agents in systems of polar or non-polar organic liquids and water.

In still another preferential aspect of the invention the compound of Formula I wherein R and $R_1$ are both $\overline{C}_7H_{15}$ has exceptionally high wetting and low foaming properties.

The compounds of Formula I may be prepared by heat reacting preferably in an aqueous medium about 1 mole of hydroxy propane sultone, described in my U.S. Patent 3,100,779 issued Aug. 13, 1963, with about 0.5 to about 0.8 and preferably about 0.66 mole of a compound of Formula A:

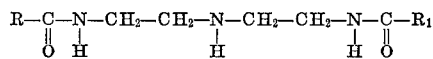

wherein R and $R_1$ are as hereinbefore defined in the definition of Formula I. Then the resultant reaction product, which apparently is an internal salt of the sultone at the secondary amino group of the compound of Formula A is treated with an aqueous solution of an alkali metal, preferably sodium or potassium to produce compounds of Formula I, wherein X is alkali metal. Such compounds may be treated with an acid, such as hydrochloric or phosphoric acid for example or other suitable acid, to provide compounds of Formula I, wherein X is hydrogen.

The sultone is of the following formula:

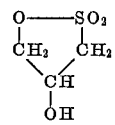

and is prepared according to Example Y herebelow.

EXAMPLE Y

About 104 grams of sodium meta bisulfite $Na_2S_2O_5$ were charged into a glass flask and then there was also charged into said flask 600 grams of water into which was dissolved 1 cc. of a 50% aqueous solution of NaOH thereby to dissolve said sodium meta bisulfite therein. The solution was then heated to about 90° C. and maintained at that temperature for a period of about 15 minutes thereby to convert substantially all of the sodium meta bisulfite to sodium acid sulfite ($NaHSO_3$). The resultant solution of sodium acid sulfite was cooled to about 28° C. and by slow additions 101 grams of epichlorohydrin was added thereto with constant stirring over a 45 minute period, and the temperature of the mass, throughout said period was controlled by external cooling, thereby to maintain the temperature thereof at about 57°–50° C. throughout said period. Thereafter and for the next 2½ hours, stirring of the mass was continued and its temperature maintained at 47°–50° C. Then with or without a reflux condenser coupled with said flask, the mass therein was heated to boiling and maintained in that condition for a period of about 1 hour. Then the mass in said flask is cooled to room temperature, is hereinafter known as Mass Y and consists essentially of an aqueous solution of the novel sultone, whose structural formula is hereinbefore set forth and NaCl by-product.

Compounds of Formula A may be produced in a number of different ways. Some of the methods which may be used are to react diethylene triamine with one or a mixture of two fatty acids [$R_1$—COOH] or methyl or ethyl esters thereof. The reaction may be carried out under atmospheric or sub-atmospheric conditions and in the presence or absence of an inert diluent or solvent. When the monoacidyl derivatives of the diethylene triamine are desired and herein used as intermediates in the production of compounds of Formula A, the mole ratio of the fatty acid and the diethylene triamine reactants is 1 to 1 plus a slight excess which is about .1. The reaction is initiated and continued until one mole of water of reaction has been formed and removed thereby to produce an organic reaction mass consisting essentially of a compound of the following generic Formula B:

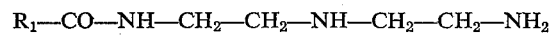

Compounds of Formula B may be reacted with an organic [R—COOH] in the mole proportions of about 1 to 1 until one mole of water of reaction has been produced and collected thereby to produce an organic reaction mass consisting essentially of a compound of Formula A. Instead of using the two-step process as described above, a mixture of 1.1 moles of diethylene triamine are mixed with two moles of one or a mixture of two or more of said fatty acids and reaction is initiated and continued until two moles of water of reaction have been produced and collected thereby to provide a reaction mass consisting essentially of a compound of Formula A wherein R and $R_1$ are the same when a single fatty acid is used in the reaction and wherein R and $R_1$ are different when the fatty acids employed in the reaction are different.

Illustrative examples of compounds of Formula A and methods for producing them are described in the following Examples A-1 to A-14.

EXAMPLE A-1

Charge into a glass reaction vessel, equipped with stirrer, thermometer, and reflux condenser having a collector coupled therewith at the outer end thereof, 1 gram mole of capric acid and 1.1 gram moles of diethylene triamine. Start and maintain stirrer in operation and apply external heat to raise and maintain the temperature of the mix in the vessel in the range of 180°–200° C. until 1 gram mole of water of reaction is produced and collected. Maintain the mass therein in that temperature range, remove condenser and reduce pressure and maintain pressure in the vessel at about 8 mm. of mercury pressure to strip off excess diethylene triamine thereby to provide a reaction mass, consisting essentially of a compound of Formula B, with $R_1$ being the hydrocarbon radical of the acid reactant. Remove external heat and then add a quantity of xylol to said mass to cool same after which add 1 gram mole of glacial actic acid.

Said quantity of xylol by weight is 2 times the combined weights of said mass and acid. Recouple the reflux condenser and collector to the vessel. Reapply external heat to the vessel to cause and maintain the mass therein in boiling condition. This is continued until 1 gram mole of water of reaction is produced and collected. In the course of this reaction some of the xylol, water of reaction and the acid are distilled over into the collector. The distillate separates into two layers: a xylol layer and aqueous layer. Periodically, return the xylol layer to the reaction vessel and remove and weigh water layer and determine the quantity of the acid therein. Add to the reaction mass a quantity of the acid equal to the quantity thereof, if any, found in the water layer. When the total collected water of reaction measures 18 grams, remove the condenser and apply vacuum (8 mm. of mercury pressure) and continue heating to strip off the xylol thereby to provide a substantially solvent-free reaction mass, known herein as Mass A-1, consisting essentially of a compound of Formula A, wherein R is methyl and $R_1$ is the alkyl radical $C_9H_{19}$, and known herein as compound A-1.

EXAMPLE A-2

Use the same apparatus, procedure and components and proportions thereof recited in Example A-1 except that 1 gram mole of lauric acid is substituted for the 1 gram mole of capric acid thereby to provide a substantially solvent-free reaction mass, known herein as Mass A-2, consisting essentially of a compound of Formula A, wherein R is methyl and $R_1$ is the alkyl radical $C_{11}H_{23}$, and known herein as compound A-2.

EXAMPLE A-3

Use the same apparatus, procedure and components and proportions thereof recited in Example A-1 except that 1 gram mole of stearic acid is substituted for the 1 gram mole of capric acid thereby to provide a substantially solvent-free reaction mass, known herein as Mass A-3, consisting essentially of a compound of Formula A, wherein R is methyl and $R_1$ is the alkyl radical $C_{17}H_{35}$, and known herein as compound A-3.

EXAMPLE A-4

Use the same apparatus, procedure and components and proportions thereof recited in Example A-1 except that 1 gram mole of oleic acid is substituted for the 1 gram mole of capric acid thereby to provide a substantially solvent-free reaction mass, known herein as Mass A-4, consisting essentially of a compound of Formula A, wherein R is methyl and $R_1$ is the ethylenically unsaturated aliphatic hydrocarbon radical $C_{17}H_{33}$, and known herein as compound A-4.

EXAMPLE A-5

Use the same apparatus, procedure and components and proportions thereof recited in Example A-1 except that 1 gram mole of behenic acid is substituted for the 1 gram mole of capric acid thereby to provide a substantially solvent-free reaction mass, known herein as Mass A-5, consisting essentially of a compound of Formula A, wherein R is methyl and $R_1$ is the alkyl radical $C_{21}H_{43}$, and known herein as compound A-5.

EXAMPLE A-6

Use the same apparatus, procedure and components and proportions thereof recited in Example A-1 except that 1 gram mole of lauric acid is substituted for the 1 gram mole of capric acid and 1 gram mole of propionic acid is substituted for 1 gram mole of glacial acetic acid thereby to provide a substantially solvent-free reaction mass, known herein as Mass A-6, consisting essentially of a compound of Formula A, wherein R is ethyl and $R_1$ is $C_{11}H_{23}$ and known herein as compound A-6.

EXAMPLE A-7

Charge into a glass reaction vessel, equipped with stirrer, thermometer, and reflux condenser having a collector coupled therewith at the outer end thereof, 1 gram mole of capric acid, 1 gram mole of stearic acid, and 1.1 gram moles of diethylene triamine. Start and maintain stirrer in operation and apply external heat to raise and maintain the temperature of the mass in the vessel in the range of 180°–200° C. until 2 gram moles of water of reaction are produced and collected. Maintain the mass therein in that temperature range, remove condenser and reduce pressure and maintain pressure in the vessel at about 8 mm. of mercury pressure to strip off excess diethylene triamine thereby to provide a reaction mass, known herein as Mass A-7, consisting essentially of a compound of Formula A, wherein R is the alkyl radical $C_9H_{19}$ and $R_1$ is the alkyl radical $C_{17}H_{35}$, and known herein as compound A-7.

EXAMPLE A-8

Use the same apparatus, procedure and components and proportions thereof recited in Example A-7 except that for the 1 gram mole of capric acid substitute 1 gram mole of stearic acid so that in this case the original mass in the vessel consists of 2 gram moles of stearic acid and 1.1 gram moles of diethylene triamine thereby to provide a reaction mass, known herein as Mass A-8, consisting essentially of a compound of Formula A, wherein both R and $R_1$ are the same and each is the alkyl radical $C_{17}H_{35}$, and known herein as compound A-8.

EXAMPLE A-9

Use the same apparatus, procedure and components and proportions thereof recited in Example A-7 except that for the 1 gram mole of capric acid substitute 1 gram mole of caproic acid and for the 1 gram mole of stearic acid substitute 1 gram mole of caprylic acid thereby to provide a reaction mass, known herein as Mass A-9, consisting essentially of a compound of Formula A, wherein R is the alkyl radical $C_5H_{11}$ and $R_1$ is the alkyl radical $C_7H_{15}$, and known herein as compound A-9.

EXAMPLE A-10

Use the same apparatus, procedure and components and proportions thereof recited in Example A-8 except that for the 2 gram moles of stearic acid substitute 2 gram moles of caprylic acid thereby to provide a reaction mass, known herein as Mass A-10, consisting essentially of a compound of Formula A, wherein R and $R_1$ are the same and each is the alkyl radical $C_7H_{15}$, known herein as compound A-10.

EXAMPLE A-11

Use the same apparatus, procedure and components and proportions thereof recited in Example A-8 except that for the 2 gram moles of stearic acid substitute 2 gram moles of linoleic acid thereby to provide a reaction mass, known herein as Mass A-11, consisting essentially of a compound of Formula A, wherein R and $R_1$ are the same and each is the ethylenically unsaturated aliphatic hydrocarbon radical $C_{17}H_{31}$, known herein as compound A-11.

EXAMPLE A-12

Use the same apparatus, procedure and components and proportions thereof recited in Example A-8 except that for the 2 gram moles of stearic acid substitute 2 gram moles of linolenic acid thereby to provide a reaction mass, known herein as Mass A-12, consisting essentially of a compound of Formula A, wherein R and $R_1$ are the same and each is the ethylenically unsaturated aliphatic hydrocarbon radical $C_{17}H_{29}$, known herein as compound A-12.

EXAMPLE A-13

Use the same apparatus, procedure and components and proportions thereof recited in Example A-8 except that for the 2 gram moles of stearic acid substitute 2 gram moles of behenic acid thereby to provide a reaction mass, known herein as Mass A-13, consisting essentially of a compound of Formula A, wherein R and $R_1$ are the same and each is the alkyl radical $C_{21}H_{43}$, known herein as compound A-13.

EXAMPLE A-14

Use the same apparatus, procedure and components and proportions thereof recited in Example A-6 except that for the 1 gram mole of lauric acid substitute 1 gram mole of linolenic acid thereby to provide a substantially solvent-free reaction mass, known herein as Mass A-14, consisting essentially of a compound of Formula A, wherein R is ethyl and $R_1$ is the ethylenically unsaturated aliphatic hydrocarbon radical $C_{17}H_{29}$ and known herein as compound A-14.

The following are specific examples of some of the compounds of this invention and methods for preparing them, same given by way of illustration and not limitation.

EXAMPLE 1

Charge into a glass reaction vessel, equipped with a stirrer and thermometer, all of Mass Y of Example Y, which is an aqueous solution of about 1 gram mole of the organic reaction product therein known as hydroxy propane sultone. Stir and heat to 80° C. and maintain at 80° C. with constant stirring while adding thereto over a one hour period about 70%–80% of entire Mass A-1 of Example A-1 herein. Maintain stirring and allow resultant mass to stand overnight in a room at 20° C. The next morning with the mass cooled to 20° C. still maintain stirring and heat to and maintain mass at 80° C. for 3 hours. Then add thereto 88 grams of a 50% aqueous solution of sodium hydroxide over a 1 hour period while continuing stirring. Then heat entire mass to 75°–85° C. and maintain same at that temperature with continued stirring for 3 hours to produce a reaction mass consisting essentially of a specific novel resultant compound, known as I-1,
and the aqueous medium. I-1 is of Formula I, with X being sodium and R and $R_1$ being the respective radicals of Formula A-1. I-1 is a good foamer and finds use in the cosmetic field, especially as a component in shampoos.

EXAMPLES 2–14

Use 13 separate reaction vessels and employ the same apparatus, procedure, components and proportions thereof recited in Example 1, except that instead of about 70%–80% of Mass A-1 used in Example 1, use in these vessels about 70%–80% of the entire amounts of the respective Masses A-2 to A-14, thereby to produce 13 separate reaction masses consisting essentially of the aqueous medium and novel resultant compounds of Formula I, identified in the table as I-2 to I-14 respectively, whose X is sodium and whose R and $R_1$ radicals are the same as those of the respective compounds A-2 to A-14 used in these vessels and examples. Some properties of the respective compounds I-2 to I-14 are set forth under "Properties" in that table.

| Ex. | Compound of Formula A | R | $R_1$ | Resultant compound of Formula I | Properties |
|---|---|---|---|---|---|
| 2 | A-2 | $CH_3$ | $C_{11}H_{23}$ | I-2 | Better foamer than and same use as I-1. |
| 3 | A-3 | $CH_3$ | $C_{17}H_{35}$ | I-3 | Low foamer; high temperature detergent, especially useful as industrial cleaning agent. |
| 4 | A-4 | $CH_3$ | $C_{17}H_{33}$ | I-4 | Low foamer; emulsifier for systems of polar liquids, such as vegetable oils and the like, and water. |
| 5 | A-5 | $CH_3$ | $C_{21}H_{43}$ | I-5 | Low foamer; especially useful as textile softening agent. |
| 6 | A-6 | $C_2H_5$ | $C_{11}H_{23}$ | I-6 | Good foamer; same use as I-1. |
| 7 | A-7 | $C_9H_{19}$ | $C_{17}H_{35}$ | I-7 | Low foamer; especially useful as textile softening agent. |
| 8 | A-8 | $C_{17}H_{35}$ | $C_{17}H_{35}$ | I-8 | Low foamer; less water-soluble but better textile softening agent than I-7; also useful as hair conditioner component in the cosmetic field. |
| 9 | A-9 | $C_5H_{11}$ | $C_7H_{15}$ | I-9 | Low foamer; especially useful as textile treating and industrial cleaning agent. |
| 10 | A-10 | $C_7H_{15}$ | $C_7H_{15}$ | I-10 | Exceptional wetting properties; low foamer, especially useful in textile treating, dye assistant and industrial cleaning agent. |
| 11 | A-11 | $C_{17}H_{31}$ | $C_{17}H_{31}$ | I-11 | Low foamer; emulsifier for systems of hydrocarbon mineral oils and water. |
| 12 | A-12 | $C_{17}H_{29}$ | $C_{17}H_{29}$ | I-12 | Low foamer, same use as I-11. |
| 13 | A-13 | $C_{21}H_{43}$ | $C_{21}H_{43}$ | I-13 | Low foamer, less water soluble than and same use as I-8. |
| 14 | A-14 | $C_2H_5$ | $C_{17}H_{29}$ | I-14 | Low foamer, same use as I-4. |

It is also within the purview of this invention to provide mixtures of compounds of Formula I. These may be produced by merely mixing two or more compounds of Formula I in any and all proportions; or mixing together two or more individual compounds of Formula A in any and all proportions, and then employing the mixtures as reactants in the same manner as before described in the production of compounds of Formula I. If desired, such mixtures of compounds of Formula A may be produced by reacting 1.1 gram moles of diethylene triamine with two gram moles of a mixture of two or more of said fatty acids in any and all proportions until 2 mole grams of water have been produced and collected.

Instead of using the aqueous solution of sodium hydroxide in Examples 1–14, an equivalent amount of a 50% aqueous solution of other alkali metal hydroxide, such as lithium hydroxide or potassium hydroxide may be used thereby to obtain compounds which are the same as I-1 to I-14 except that the sodium is replaced by lithium or potassium.

It is to be understood that while X is sodium in the specific Examples 1-14 heretofore described and in certain claims herein, the other alkali metals, especially potassium and lithium and also hydrogen, ammonium or other cation equivalents obviously may be substituted for the sodium.

Since certain changes may be made in carrying out the above method without departing from the scope of the invention herein claimed, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall therebetween.

I claim:
1. A compound of the generic formula:

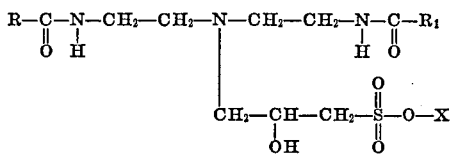

wherein R and $R_1$ are aliphatic hydrocarbon groups, straight or branch chain, and saturated or ethylenically unsaturated; R is of 1-21 carbon atoms and $R_1$ is of 5-21 carbon atoms and X is sodium, potassium, lithium, ammonium or hydrogen.

2. A compound according to claim 1, with X being sodium.

3. A compound according to claim 1, with R being of 5-21 carbon atoms.

4. A compound according to claim 1, with R and $R_1$ being the same and each being of 5-21 carbon atoms.

5. A compound according to claim 1, with R being $CH_3$ and $R_1$ being an alkyl group of 9-13 carbon atoms.

6. A compound according to claim 1, with R and/or $R_1$ being ethylenically unsaturated hydrocarbon group of 17 carbon atoms.

7. A compound according to claim 1, with R being $CH_3$ and $R_1$ being $C_{11}H_{23}$.

8. A compound according to claim 1, with R being $CH_3$ and $R_1$ being $C_9H_{19}$.

9. A compound according to claim 1, with both R and $R_1$ being $C_7H_{15}$.

References Cited
UNITED STATES PATENTS

| 3,168,538 | 2/1965 | Mannheimer | 260—401 |
| 3,280,179 | 10/1966 | Ernst | 260—501 |
| 3,492,324 | 1/1970 | Blackman | 260—404.5 |

ELBERT L. ROBERTS, Primary Examiner

U.S. Cl. X.R.
260—404.5